US011319937B2

(12) United States Patent
Arntz et al.

(10) Patent No.: US 11,319,937 B2
(45) Date of Patent: May 3, 2022

(54) HEAT RECEIVER FOR URBAN CONCENTRATED SOLAR POWER

(71) Applicant: HPM Holding B.V., Utrecht (NL)

(72) Inventors: Hendrikus Petrus Maria Arntz, Utrecht (NL); Gianluigi Trivelli, Utrecht (NL); Claudio Raggi, Utrecht (NL)

(73) Assignee: HPM Holding B.V., Utrecht (NL)

( * ) Notice: Subject to any disclaimer, the term of this patent is extended or adjusted under 35 U.S.C. 154(b) by 0 days.

(21) Appl. No.: 17/063,932

(22) Filed: Oct. 6, 2020

(65) Prior Publication Data
US 2021/0115908 A1    Apr. 22, 2021

Related U.S. Application Data

(60) Provisional application No. 63/058,626, filed on Jul. 30, 2020, provisional application No. 63/028,026, (Continued)

(51) Int. Cl.
*F24S 20/60* (2018.01)
*F24S 20/67* (2018.01)
(Continued)

(52) U.S. Cl.
CPC .............. *F03G 6/06* (2013.01); *F24S 20/60* (2018.05); *F03G 6/061* (2021.08); *F24S 20/20* (2018.05); *F24S 20/67* (2018.05)

(58) Field of Classification Search
None
See application file for complete search history.

(56) References Cited

U.S. PATENT DOCUMENTS

| 1,989,999 A * | 2/1935 | Niederle | F24S 20/20 126/573 |
| 3,972,183 A * | 8/1976 | Chubb | F24S 20/20 60/641.8 |

(Continued)

FOREIGN PATENT DOCUMENTS

WO    WO2015089273    6/2015

OTHER PUBLICATIONS

Lovegrove et al. Concentrating solar: power technology Principles, developments and applications. Woodhead Publishing Series in Energy: No. 21, 2012, 701 pages.
(Continued)

*Primary Examiner* — Avinash A Savani
*Assistant Examiner* — Deepak A Deean
(74) *Attorney, Agent, or Firm* — Lumen Patent Firm

(57) ABSTRACT

An urban concentrated solar power for mounting on a roof top is provided. The urban concentrated solar power has a heat receiver has a non-circular duct that distinguishes an insulated area with an insulation layer on the outer surface of the non-circular duct and a non-insulated area. The non-circular duct contains a heat transferring fluid which can reach temperatures of at least 500 degrees Celsius. A parabolic trough with an aperture of below 2 meters concentrates sunlight onto the non-insulated area of the non-circular duct of the heat receiver. The heat receiver can be placed in a glass tube. Due to roof top mounting the electricity can be generated in proximity of the user and as a result decrease net congestion. The low-cost heat receiver design will make electricity generated by urban CSP competitive with electricity from fossil fuel plants and PV combined with lithium-ion battery storage.

10 Claims, 10 Drawing Sheets

Related U.S. Application Data filed on May 21, 2020, provisional application No. 62/969,106, filed on Feb. 2, 2020, provisional application No. 62/916,022, filed on Oct. 16, 2019.

(51) Int. Cl.
*F24S 20/20* (2018.01)
*F03G 6/06* (2006.01)

(56) References Cited

U.S. PATENT DOCUMENTS

| | | | | |
|---|---|---|---|---|
| 4,043,318 A * | 8/1977 | Pei | ............ | F24S 10/45 165/142 |
| 4,151,828 A * | 5/1979 | Mather | ............ | F24S 23/74 126/677 |
| 4,153,042 A * | 5/1979 | Tragert | ............ | F24S 10/45 126/649 |
| 4,307,712 A * | 12/1981 | Tracy | ............ | F24S 23/74 126/606 |
| 4,311,132 A * | 1/1982 | van Kuijk | ............ | F24S 10/742 126/655 |
| 4,380,995 A * | 4/1983 | Robertson | ............ | F24S 30/40 126/677 |
| 4,440,155 A * | 4/1984 | Maloof | ............ | F24S 20/20 359/743 |
| 4,469,088 A * | 9/1984 | Anzai | ............ | F24S 20/20 126/618 |
| 8,978,642 B2 * | 3/2015 | Stettenheim | ............ | F24S 10/70 126/692 |
| 9,297,554 B2 * | 3/2016 | Stettenheim | ............ | F24S 23/74 |
| 9,404,675 B2 * | 8/2016 | Stettenheim | ............ | F03G 6/06 |
| 2010/0043779 A1 * | 2/2010 | Ingram | ............ | F24S 40/80 126/694 |
| 2010/0269816 A1 * | 10/2010 | Polk, Jr. | ............ | F24S 20/20 126/600 |
| 2010/0326424 A1 | 12/2010 | Bennett | | |
| 2011/0174298 A1 * | 7/2011 | Aldrich | ............ | F24S 80/30 126/677 |
| 2013/0192226 A1 * | 8/2013 | Stettenheim | ............ | F24S 23/74 60/641.15 |
| 2013/0213387 A1 * | 8/2013 | Stettenheim | ............ | F24S 80/50 126/654 |
| 2013/0220307 A1 * | 8/2013 | Stettenheim | ............ | F24S 23/74 126/652 |
| 2013/0220312 A1 * | 8/2013 | Stettenheim | ............ | F24S 23/74 126/714 |
| 2013/0276775 A1 * | 10/2013 | Stettenheim | ............ | F24S 30/40 126/652 |
| 2013/0314774 A1 * | 11/2013 | Page | ............ | G02B 19/0042 359/361 |
| 2013/0327316 A1 * | 12/2013 | Bourgeois | ............ | F24S 10/72 126/561 |
| 2016/0201947 A1 * | 7/2016 | Stettenheim | ............ | F24S 70/60 126/714 |
| 2016/0268968 A1 * | 9/2016 | Demers | ............ | F24S 30/452 |
| 2018/0187925 A1 * | 7/2018 | Citron | ............ | F24S 30/425 |

OTHER PUBLICATIONS

Stettenheim et al. Design and Field Testing of Manufacturable Advanced Low-Cost Receiver for Parabolic Trough Solar Power, 2019, 49 pages.

* cited by examiner

| | 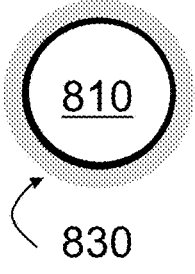 830 | 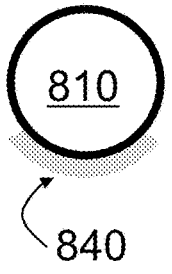 840 | 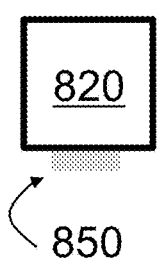 850 | 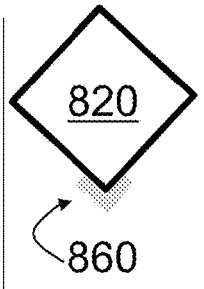 860 |
|---|---|---|---|---|
| Focal spot | $2r\sin(\theta_S)$ | $\dfrac{4r\sin(\theta_S)}{\cos(\frac{\varphi_R}{2})}$ | $\dfrac{2r\sin(\theta_S)}{\cos(\varphi_R)}$ | $4r\tan(\theta_S)$ |
| $\varphi_R$ (@$C_{max}$) | 90° | 70° | 45° | 90° |
| $C_{max}$ | 69 | 83 | 108 | 108 |
| Heat flux [kW/m²] | 69 | 83 | 108 | 108 |
FIG. 8

HEAT RECEIVER FOR URBAN CONCENTRATED SOLAR POWER

FIELD OF THE INVENTION

The present invention relates generally to concentrated solar power. More particularly, the invention relates to parabolic troughs that heat a heat transferring fluid in a heat receiver and are designed to be mounted on roof tops.

BACKGROUND OF THE INVENTION

With the change from fossil to sustainable energy there is a demand for sustainable energy generated in proximity of the user. In addition, due to the large amounts of intermittent sustainable energy, there is further a growing demand to store such sustainable energy.

Concentrated Solar Power (CSP) is a technology where sunlight is concentrated to a heat receiver. One of the CSP technologies is a parabolic trough that concentrates the sunlight on a heat receiver. The heat receiver is a metal duct that contains a Heat Transferring Fluid (HTF), generally these ducts are encapsulated and evacuated in a glass cylindrical tube. Examples of the HTF are water to create steam or another medium such as synthetic oil or molten salt to create steam in a later stage.

Heating the HTF to a high temperature of about 550 degrees Celsius is desirable to enable a high Carnot efficiency of the Rankine cycle. Storage of this high temperature HTF is known as Thermal Energy Storage (TES).

Current parabolic troughs have an aperture of about 6 meters and are placed on sun rich fields, like outside urban areas. An example is the Archimede CSP plant in Sicily that heats molten salt to 550 degrees Celsius with 5.9 meters aperture troughs. In urban areas, however, there is no place to install troughs in arrays and these troughs are too big to put on roofs. Hence, to enable the installment of parabolic troughs in urban areas the aperture needs to be decreased from about 6 meters to about 1 meter. This size is small enough to prevent high static loads and dynamic wind loads on rooftops. However, due to a minimal required concentrated irradiation at the heat receiver the hydraulic inner diameter of the heat receiver decreases to about 2-9 mm. As a result, the power required to pump the HTF trough the heat receiver is about 907000-953% of the electrical output of the CSP plant for respectively hydraulic inner diameter of the heat receiver ranging from 2-9 mm. An example of small aperture parabolic troughs is the 2 MW CSP plant constructed by Sopogy in Hawaii at apertures of 1.35 m. Sopogy's circular heat receiver has a maximum operating HTF temperature of 287 degrees Celsius. Due to this low temperature it is challenging to generate the desired 2 MW and provide TES.

The present invention addresses these challenges and advances the art to enable a high temperature (about 550 degrees Celsius) HTF generation of small scale (about 1 meter aperture) parabolic troughs.

SUMMARY OF THE INVENTION

An urban concentrated solar power for mounting on a roof top is provided. The urban concentrated solar power has a heat receiver has a non-circular duct that distinguishes an insulated area with an insulation layer on the outer surface of the non-circular duct and a non-insulated area. The non-circular duct contains a heat transferring fluid which can reach temperatures of at least 550 degrees Celsius. A parabolic trough with an aperture of below 2 meters concentrates sunlight onto the non-insulated area of the non-circular duct of the heat receiver. The hear receiver can be placed in a glass tube.

The non-circular duct can have a variety of shapes, especially shapes that fit the technical constraint to achieve the performance of the urban concentrated solar power. These shapes can be defined in one embodiment by the non-circular duct having an irradiated duct area versus total duct area ranging from 5% to 30%. The duct area is defined as the duct perimeter multiplied by the length of the duct. In one embodiment, the non-circular duct has an inner diameter of 31 mm.

Embodiments of the invention enable the possibility to heat molten salt to 550 degrees Celsius in urban areas with small parabolic troughs. The Thermal Energy Storage (TES) provides a competitive storage solution at about 15$/kWh in relation to lithium-ion batteries (about 100$/kWh). Due to roof top mounting the electricity can be generated in proximity of the user and as a result decrease net congestion. The low-cost heat receiver design will make electricity generated by urban CSP competitive with electricity from fossil fuel plants and PV combined with lithium-ion battery storage.

BRIEF DESCRIPTION OF THE DRAWINGS

FIG. 8 shows the maximum concentration ratios of sunlight on a receiver of different receiver shapes. The principle is the same as a magnifying glass, the smaller the focal point, i.e. the higher the concentration ratio, the easier it is to make a fire, i.e.: obtain high molten salt temperatures.

DETAILED DESCRIPTION

Figure 1:
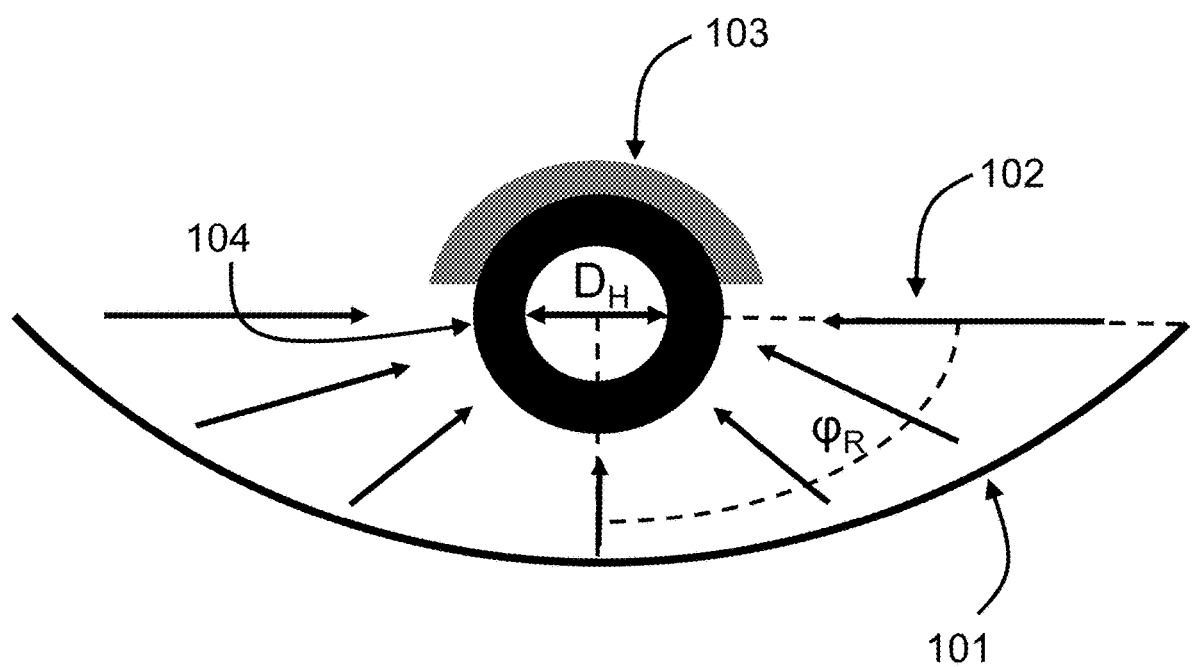
FIG. 1 shows a cross section of a parabolic trough arrangement according to the current state of the art.
Figure 2A:
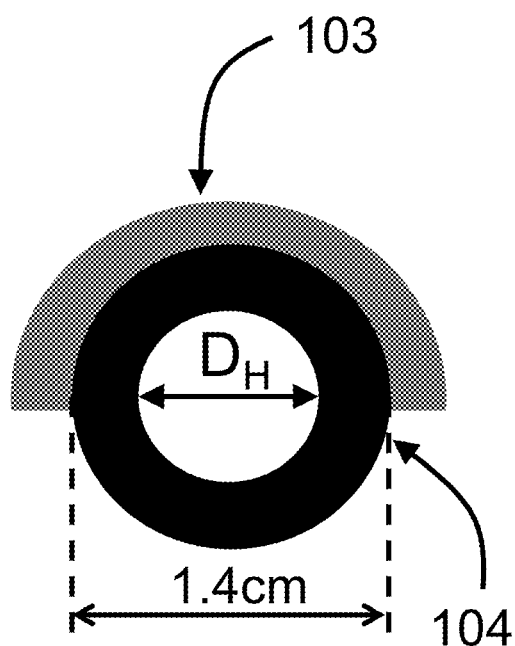
FIGS. 2A-B show a heat receiver according to the current state of the art (option 1).
Figure 2B:
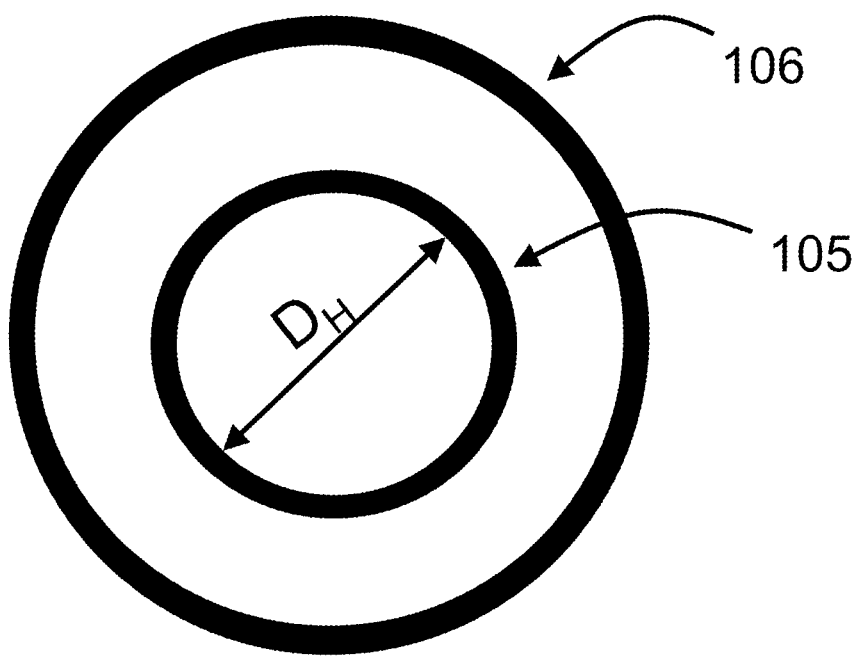

FIG. 1 shows a cross section of a parabolic trough arrangement according to the current state of the art. Sunlight 102 enters the aperture of the parabolic trough 101, which concentrates the sunlight at angle $\varphi_R$, to the bottom of the duct 104 with internal hydraulic diameter $D_H$, containing the heat transfer fluid (HTF). The insulation 103 on the top part of the tube prevents excessive heat losses. FIG. 2A shows option 1 which demonstrates according to the current state of the art a heat receiver where the outer diameter of the duct 104 is 1.4 cm and the hydraulic diameter ($D_H$) 10 mm. At a reflector aperture of 1.35 m the concentration ratio is (1350 mm/0.5×π×14 mm=) 61. Another version of the state of the art is where the duct 105 is concentrically encapsulated in a glass cylinder 106 (FIG. 2B).

Figure 3A:
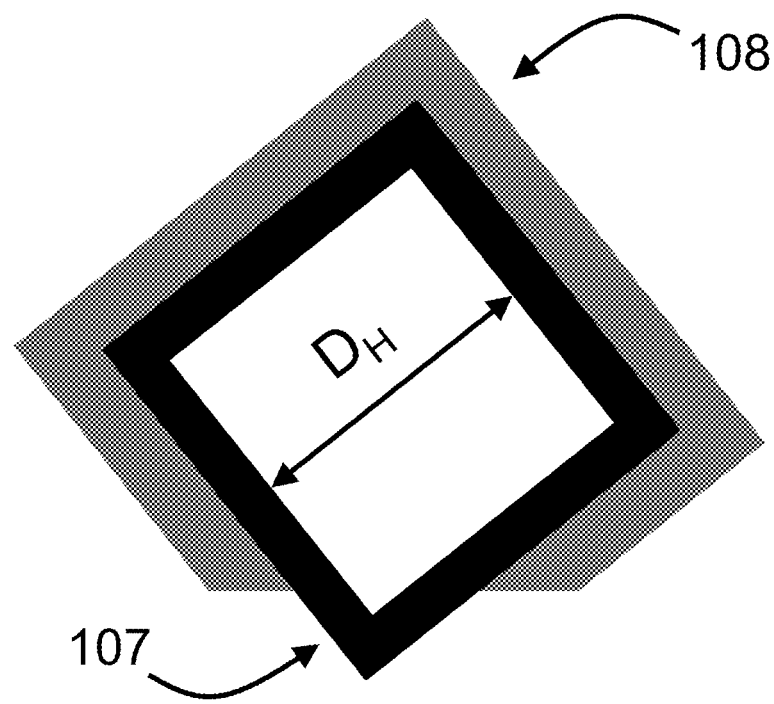
FIGS. 3A-B show according to exemplary embodiments of the invention a heat receiver with a rectangular duct where one area around one corner is where the irradiation is concentrated (option 2).
Figure 3B:
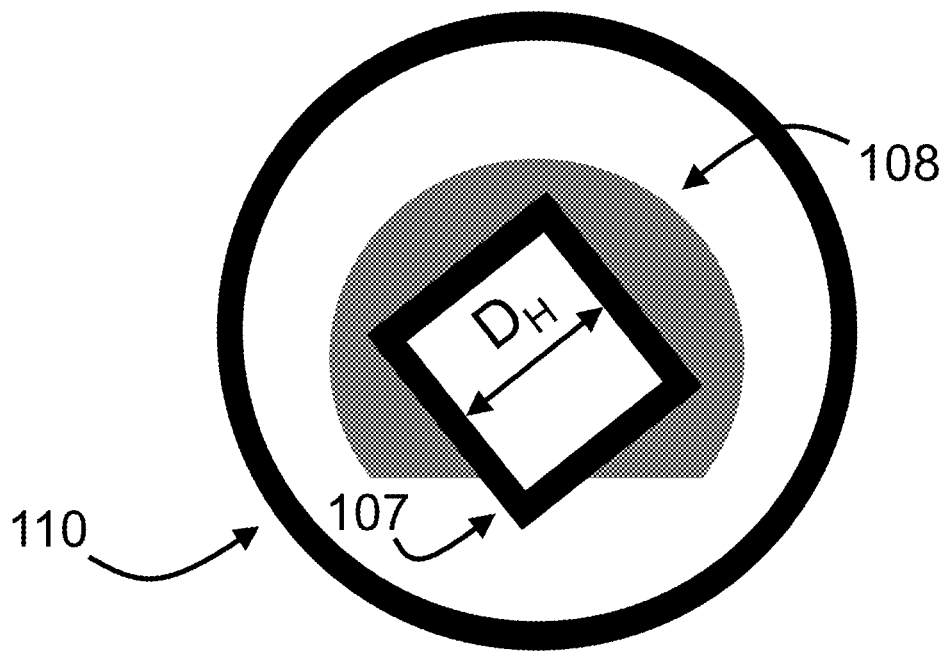

FIG. 3A shows option 2, where the rectangular duct 107 pertains an embodiment of the invention, has an insulation 108 and focuses the solar irradiation on the heat receiver. However, in option 2 the duct has a larger hydraulic diameter (DO to lower the pressure drop of the HTF flow through the rectangular duct. The angles of this rectangular duct can have round corners and although the rectangular is a drawn as a square it does not have to be a square as long as the irradiated (non-insulated) bottom is a triangle. The entire heat receiver can also be placed in a glass tube 110 (FIG. 3B)

Option 2 and 4 have a maximum HTF temperature of 772 degrees Celsius at the lowest pressure drop. Hence, the overall CSP system efficiency of these options will be the highest.

The power loss due to the pressure drop is calculated by equation 1:

$$P_{loss, pressure\ drop} = \Delta p V'  \quad \text{Equation 1}$$

Where $\Delta p$ is the pressure drop given by the Darcy-Weissbach equation and V' is the volume flow. Radiation is the dominant heat flux from the duct to the inner diameter of the glass at an annular pressure of 1 mbar in the glass cylinder.

TABLE 1

Power losses for five different type of heat receivers and their related options at maximum concentration ratios (FIG. 8), reflectors of 1.35 m aperture to generate 1000 kW, emissivity of absorptive painting of 0.50 (@T = 550 degrees Celsius) on irradiated part and polished aluminum of 0.15 (@T = 550 degrees Celsius) on insulated part of the duct.

|  | State of the art: Option 1 | Invention: Option 2 | Invention: Option 3 | Invention: Option 4 |
|---|---|---|---|---|
| FIG. | 2B | 2A | 3B | 4A | 5A |
| Maximum Solar concentration factor $C_{max}$ | 69 | 83 | 108 | 108 | 108 |
| Hydraulic inner diameter $D_H$ (wall thickness of 2 mm) [mm] | 2 | 9 | 31 | 31 | 31 |
| Irradiated duct area/ total duct area | 100% | 39% | 9% | 9% | 9% |
| $T_{HTF, max}$ [° C.] | 896 | 794 | 772 | 675 | 772 |
| $P_{loss, pressure\ drop}$ [kW] | 9070000 | 9529 | 19 | 31 | 19 |
| $P_{loss}/P_{generated}$ [%] | 907000% | 953% | 2% | 3% | 2% |

The insulation 108 can also have an additional outer layer, like aluminum foil, to minimize radiation.

Figure 4A:
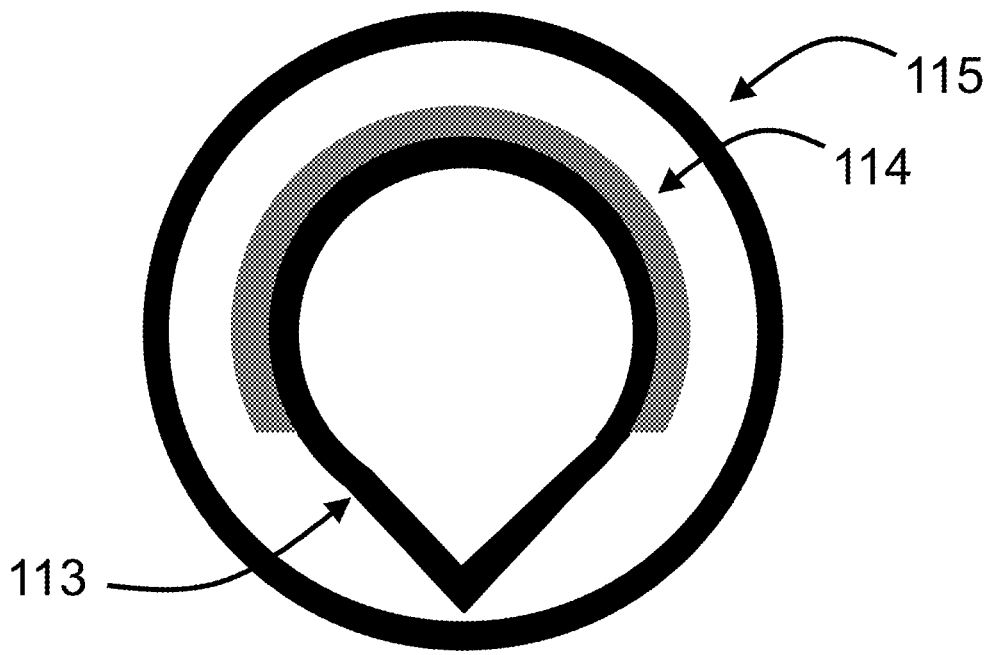
FIGS. 4A-C show according to exemplary embodiments of the invention a heat receiver with a circular duct with a triangle at the bottom where irradiation is concentrated (option 3).
Figure 4B:
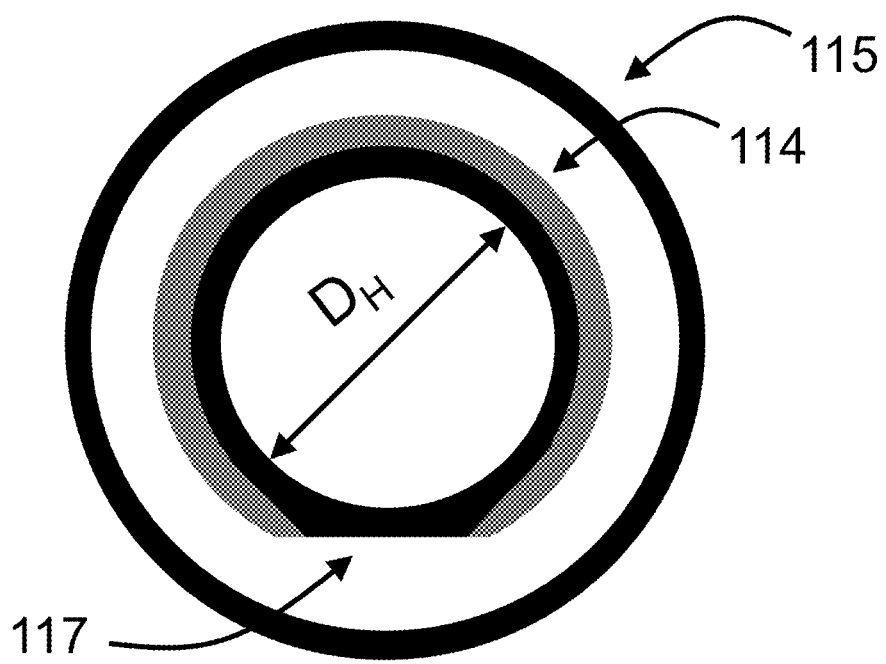
Figure 4C:
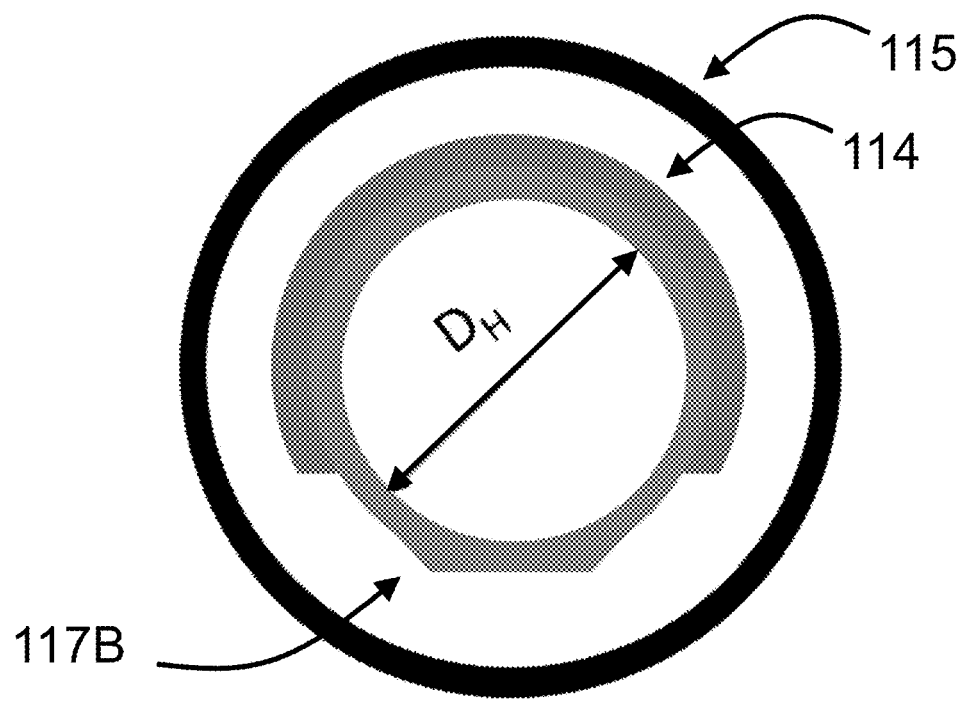

FIG. 4A shows option 3. The duct 113 is circular (or oval), but has a triangle at the bottom where the irradiation is concentrated on. At the non-irradiated part an insulation 114 is placed and both the duct 113 and the insulation 114 can be placed in a concentric glass tube 115. Another version of this option is duct 117, 117B where the triangle is flattened at the bottom (FIG. 4B or FIG. 4C). The insulation 114 can also have an additional outer layer, like aluminum foil, to minimize radiation.

Figure 5A:
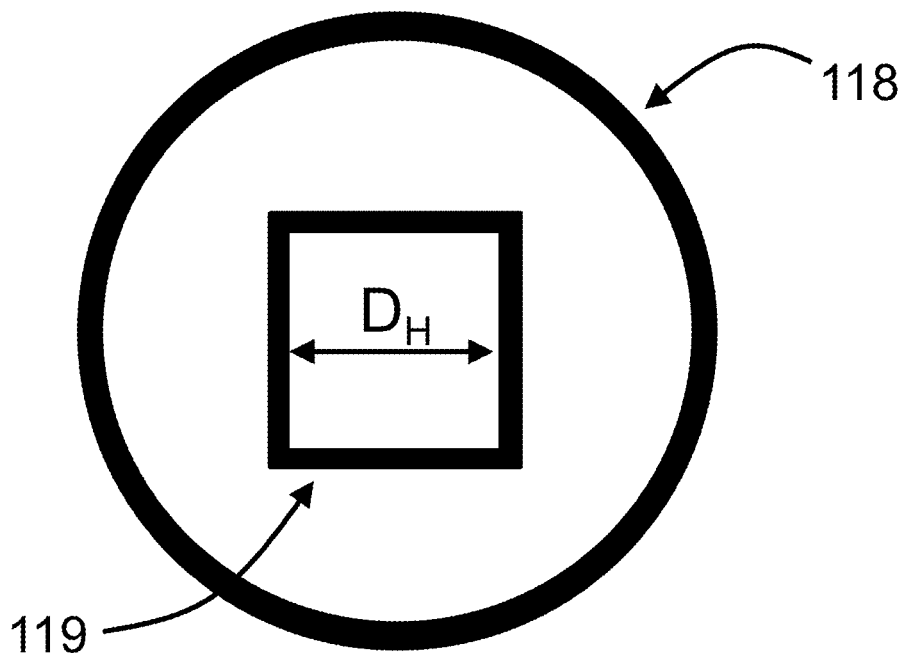
FIGS. 5A-C show according to exemplary embodiments of the invention a heat receiver with a rectangular duct where one flat area of the duct is where the irradiation is concentrated (option 4).
Figure 5B:
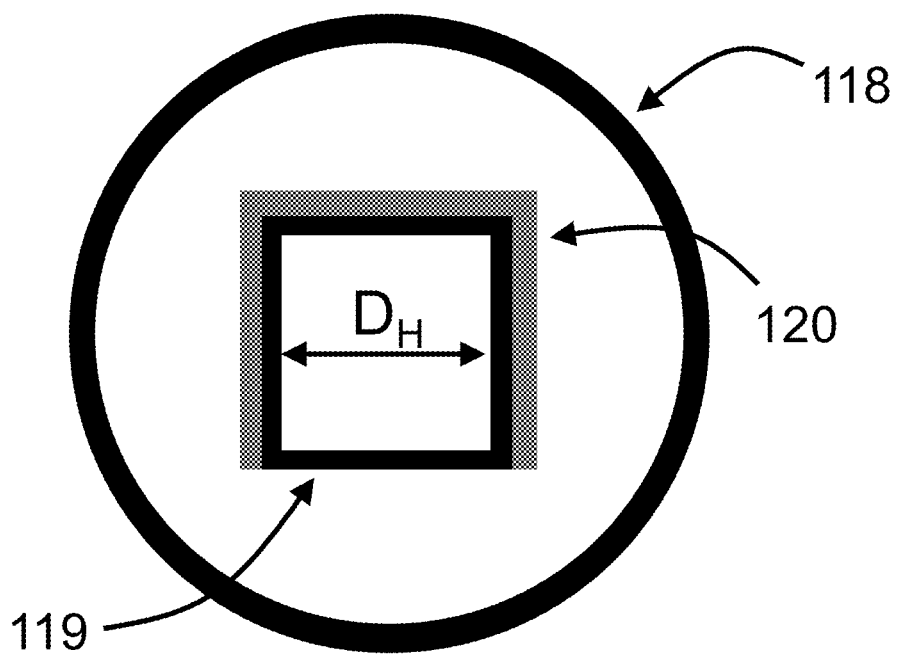
Figure 5C:
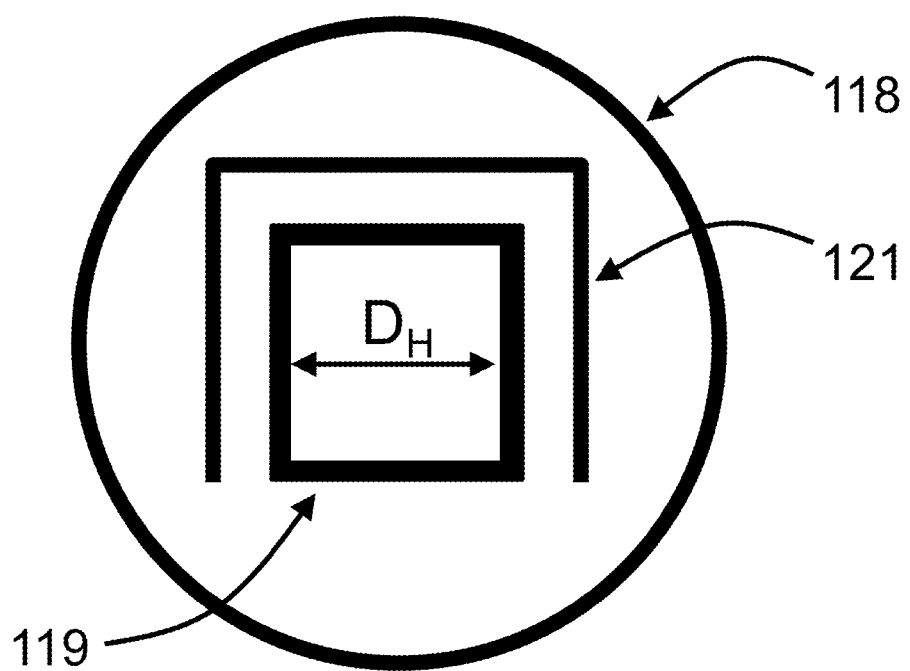

FIG. 5A shows option 4 and is another version of the invention. The rectangular duct 119 has a flat bottom where the irradiation is concentrated on. At the non-irradiated part an insulation 120 can be added, like fiber paper (FIG. 5B) to minimize radiation from the insulated surface. This insulating layer 120 can also be covered with an additional layer, like aluminum foil, to minimize radiation. A third alternative of option 4 is heat shield 121 covering the rectangular duct to minimize radiation (FIG. 5C). All alternatives of option 4 can be concentrically encapsulated in a glass cylinder 118.

The consequences in terms of power and temperature between option 1, option 2, option 3 and option 4 are shown in the TABLE 1 for a concentrated solar power plant with a trough of 1.35 meters aperture width, 8000 meters length, molten salt mass flow of 2.5 kg/s, ambient wind velocity of 3.6 m/s and a direct normal irradiance of 950 W/m² to generate 1000 kW of electricity. Embodiments of the invention enable the generation of high temperatures of 500 degrees Celsius HTF or higher with parabolic troughs at small scale below 2 meters aperture to be placed at roof tops.

For a CSP plant with parabolic troughs of around 1.35 meters aperture width—and other apertures below 2.0 meter—it is essential that the losses due to the pumping of the HTF through the heat receiver are kept to a minimum and in the range of 0-5% of the generated power. Only options 2, 3 and 4 are capable of generating high temperatures HTF at small aperture troughs at a positive overall CSP plant efficiency. The pressure drop of option 1 can be decreased to 3% of generated power by increasing the hydraulic inner diameter also to 31 mm. However, this will decrease $T_{HTF,max}$ to 499 degrees Celsius. It will require an infinite time to heat the molten salt to 499 degrees Celsius and it is impossible to reach the required 550 degrees Celsius.

In a serial connection of 8000 m of heat receivers a minimal internal hydraulic diameter of around 30 mm is required to ensure the power to overcome the pressure drop is at ~2% of generated power. At a parallel connection of 10 serial connections of 800 m heat receivers, the minimal internal hydraulic diameter is 8 mm to maximize the pressure drop at 2%. So, option 1 would enable a high temperature HTF at an acceptable pressure drop at a parallel arrangement of heat receivers. However, the second moment of inertia of option 1 at 8 mm internal hydraulic diameter is around 4 times smaller as options 2, 3 and 4. As a consequence the metal duct will deform and the sunlight concentrated from the parabolic trough 101 of FIG. 1 will (partially) miss the duct. To ensure a rigid duct and a low pressure drop, the internal hydraulic diameter should be 15 mm or more.

Options described in FIGS. 3A, 3B and 4A have an irradiated point at a significant higher temperature as the upper insulated part of the duct. Due to this temperature inhomogeneity it could be challenging to minimize deformation of the duct. However, this effect could be minimized through an optimized heat transfer, by a high conductance duct material, thin duct, a turbulent molten salt flow, or a combination thereof.

Figure 6:
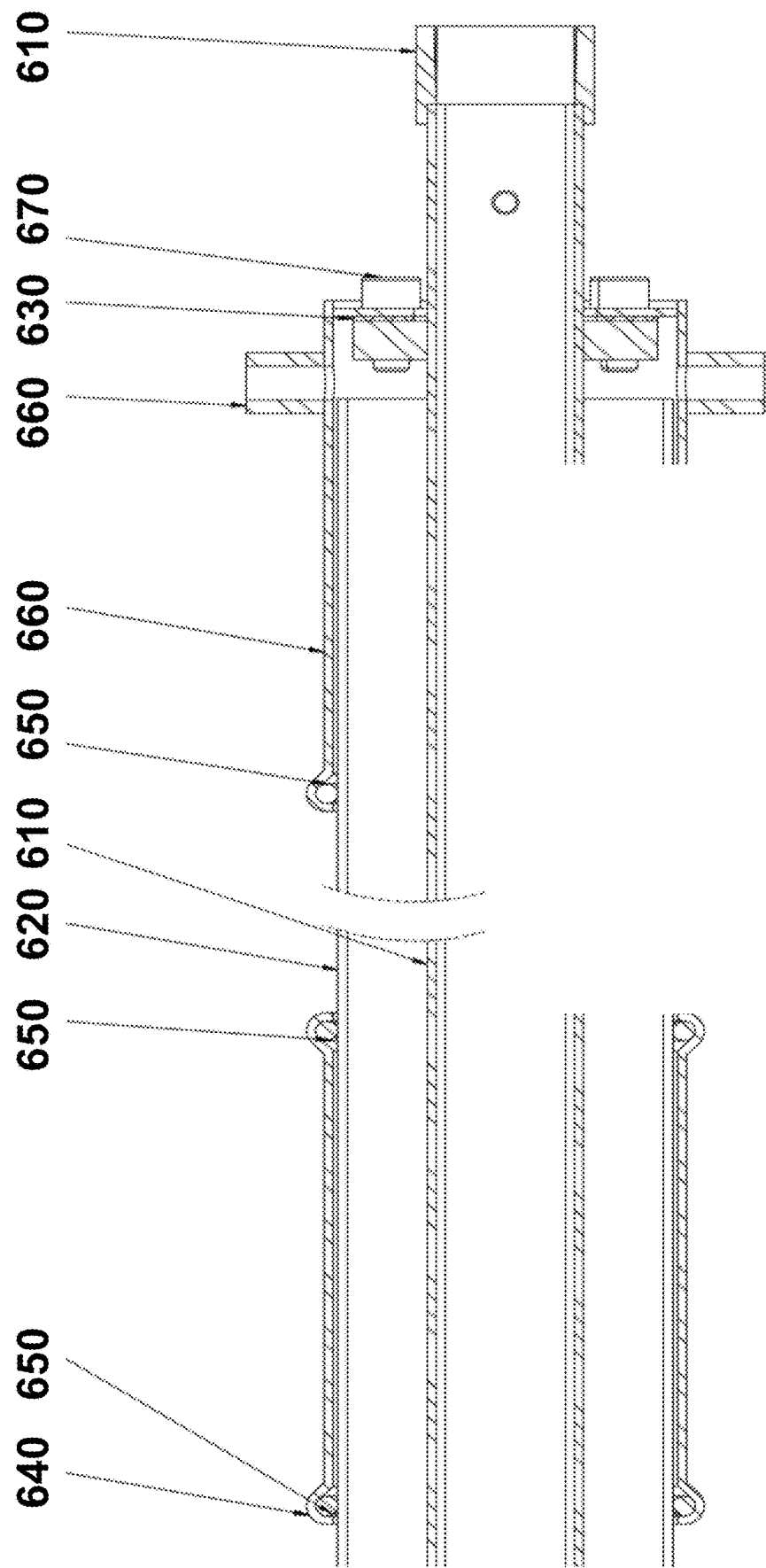
FIG. 6 shows according to exemplary embodiments of the invention cross sections of a receiver arrangement.

FIG. 6 shows a cross section of a receiver arrangement (options 2 and 4), where 610 indicates the steel receiver duct including the conversion at the end from a rectangular duct to a circular pipe. 620 is the glass circular pipe, 630 indicates the gasket to minimize heat losses and ensure vacuum sealing, 640 is the coupling to fixate the receiver to a ground structure or the reflector, 650 is a rubber O-ring between the glass 620 and coupling 640. At the end coupling 660, the O-ring 650 has another function, namely vacuum sealing. End coupling 660 is mounted through bolts 670 on the duct 610 end and can move in longitudinal direction, along the glass pipe 620, to capture thermal expansion of the duct. As a result, internal convection can be minimized without glass-metal welding. It is noted that glass-metal weldings are expensive solutions for heat receivers.

To minimize heat losses through convection a vacuum is created in the glass annulus. In the art, a glass-metal welding ensures a vacuum throughout the lifetime of the receiver. It also incorporates a bellow that captures different thermal expansion of the glass and metal. Inventor suggests an active vacuum that ensures a vacuum from sunrise to sunset. At least one vacuum connection is mounted on the end coupling 660 for the connection to a vacuum pump. In FIG. 6 two connections are shown: one for a vacuum pump and the other one for a pressure gauge. Before the start of each day the vacuum pump draws the vacuum in the glass annulus.

Figure 7:
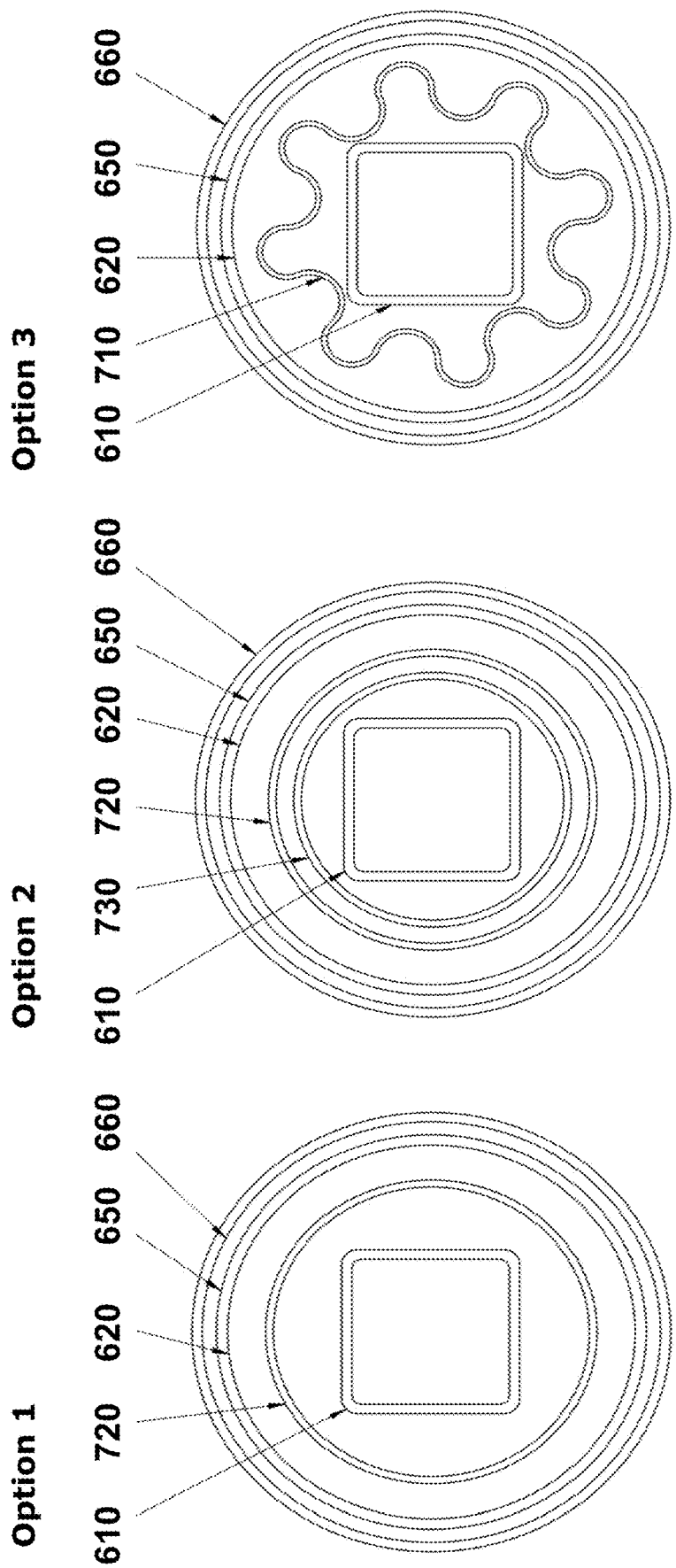
FIGS. 7A-C show according to exemplary embodiments of the invention different heat shield configurations.

To protect the O-rings 650 from the duct 610 high temperatures (550 degrees Celsius), one or multiple heat shields can be added in different shapes. In FIGS. 7A-C, three options of a heat shield configuration are shown through a cross section of end coupling 660. Through these heat shields a cooling of 400 degrees Celsius can be achieved over 2 cm distance to prevent the melting of the rubber O-ring 650.

FIGS. 7A-C shows three embodiments of a heat shield. In option 1, one circular heat shield 720 is added to reduce radiation, and in option 2 another circular heat shield 730 is added. Option 3 is another shape of the heat shield and as an example a ribbed heat shield 710 is illustrated.

FIG. 8 shows three different duct shapes, irradiated on four methods and further shows the maximum concentration ratio at given angles $\varphi_R$. The first example is a fully irradiated 830 cylinder 810, which has a maximum concentration ratio of 69 at an angle of attack $\varphi_R$ (FIG. 1) of 90 degrees and a maximum heat flux of 69 kW/m². The second example is a partially irradiated 840 cylinder 810, which has a maximum concentration ratio of 83 at an angle of attack of 70 degrees and a maximum heat flux of 83 kW/m². An example of this derivation is given in Equation 2:

$$C_g = \frac{\sin(\varphi_R)\cos(\frac{\varphi_R}{2})}{2\sin(\theta_S)} \quad \text{Equation 2}$$

Where $\theta_S$ is half the angular size of the sun at 0.26 degrees. Deriving $C_g$ to $\varphi_R$ will provide the maximal concentration ratio $C_g$=83 at angle of attack $\varphi_R$ of 70 degrees through Equation 3:

$$\frac{dC_g}{d\varphi_R} = \frac{d}{d\varphi_R}\left(\frac{\sin(\varphi_R)\cos(\frac{\varphi_R}{2})}{2\sin(\theta_S)}\right) = 0 \quad \text{Equation 3}$$

The third example is a square duct 820, which is irradiated on the bottom 850 and has a maximum solar concentration ratio of 108 at an angle of attack of 45 degrees and a maximum heat flux of 108 kW/m². The fourth example is a square duct 820 which is irradiated at one corner 860 and has a maximum solar concentration ratio of 108 at an angle of attack at 90 degrees and a maximum heat flux of 108 kW/m².

What is claimed is:

1. An urban concentrated solar power for mounting on a roof top, comprising:
   (a) a heat receiver having a non-circular duct distinguishing an insulated area with an insulation layer on the outer surface of the non-circular duct and a non-insulated area, wherein the non-circular duct contains a heat transferring fluid, wherein the non-circular duct has an irradiated duct area versus a total duct area of 5% to 30%, wherein the total duct area is defined as a perimeter of the non-circular duct multiplied by a length of the non-circular duct;
   (b) a glass tube holding a vacuum, wherein the heat receiver is placed within the vacuum of the glass tube;
   (c) a vacuum pump in connection with the glass tube, wherein the vacuum pump draws or redraws the vacuum within the glass tube;
   (d) a coupling with an intermediate O-ring holding an end of the glass tube;
   (e) a heat shield near the intermediate O-ring and circumferentially positioned around the heat receiver and within the glass tube wherein the heat shield protects the intermediate O-ring from a temperature of at least 400 degrees Celsius; and
   (f) a parabolic trough to concentrate sunlight onto the non-insulated area of the non-circular duct of the heat receiver.

2. The urban concentrated solar power as set forth in claim 1, wherein the parabolic trough has an aperture of below 2 meters.

3. The urban concentrated solar power as set forth in claim 1, wherein the heat transferring fluid reaches temperatures of at least 500 degrees Celsius.

4. The urban concentrated solar power as set forth in claim 1, wherein the non-circular duct comprises a square shape wherein one flat side of the square shape is the non-insulated area.

5. The urban concentrated solar power as set forth in claim 1, wherein the non-circular duct comprises a square shape wherein one corner area of the square shape is the non-insulated area.

6. The urban concentrated solar power as set forth in claim 1, wherein the non-circular duct has a circular portion with a triangular shape as the non-insulated area.

7. The urban concentrated solar power as set forth in claim 1, wherein the non-circular duct has a circular portion or an oval portion with a flat side as the non-insulated area.

8. The urban concentrated solar power as set forth in claim 1, wherein the non-circular duct comprises a rectangular shape where one flat side of the rectangular shape is the non-insulated area.

9. The urban concentrated solar power as set forth in claim 1, wherein the non-circular duct has an inner hydraulic diameter of at least 15 mm.

10. The urban concentrated solar power as set forth in claim 1, wherein the heat shield protects the intermediate O-ring from a temperature of at least 500 degrees Celsius.

* * * * *

UNITED STATES PATENT AND TRADEMARK OFFICE
CERTIFICATE OF CORRECTION

PATENT NO. : 11,319,937 B2
APPLICATION NO. : 17/063932
DATED : May 3, 2022
INVENTOR(S) : Hendrikus Petrus Maria Arntz, Gianluigi Trivelli and Claudio Raggi It is certified that error appears in the above-identified patent and that said Letters Patent is hereby corrected as shown below:

On the Title Page

The Applicant should be listed as:
Suncom Energy B.V., Utrecht, Netherlands

The Assignee should be changed from:
HPM Holding B.V.
To:
Suncom Energy B.V.

Signed and Sealed this
Twenty-fourth Day of May, 2022

*Katherine Kelly Vidal*

Katherine Kelly Vidal
*Director of the United States Patent and Trademark Office*